UNITED STATES PATENT OFFICE.

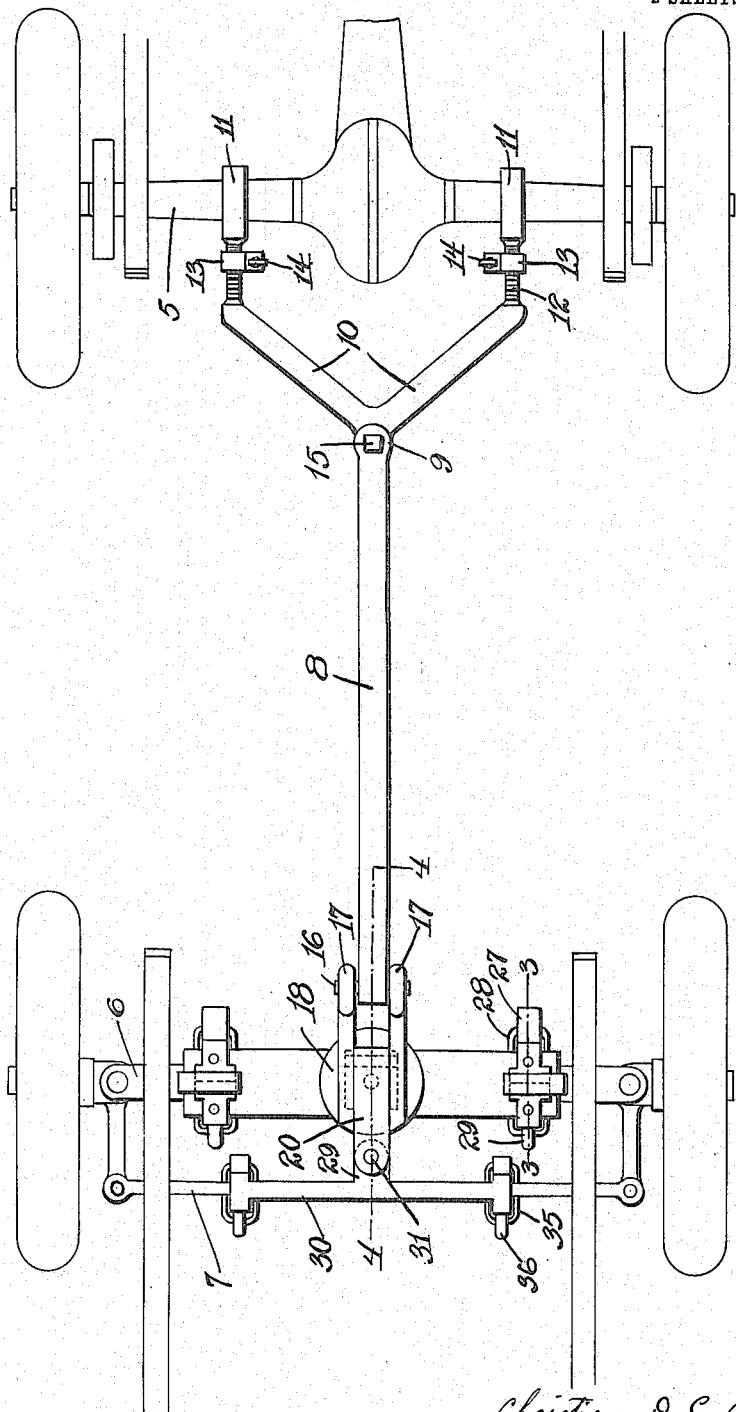

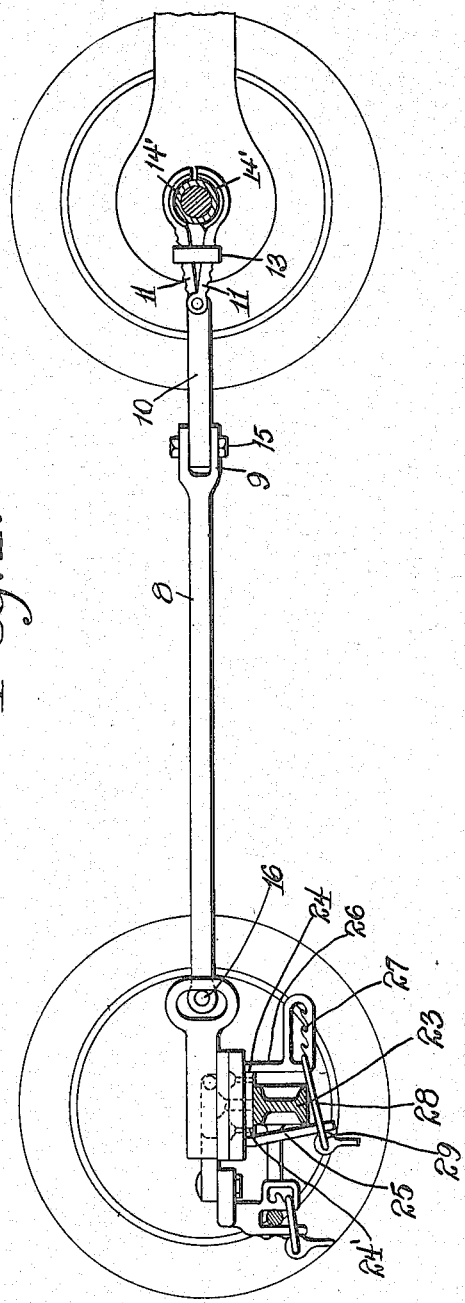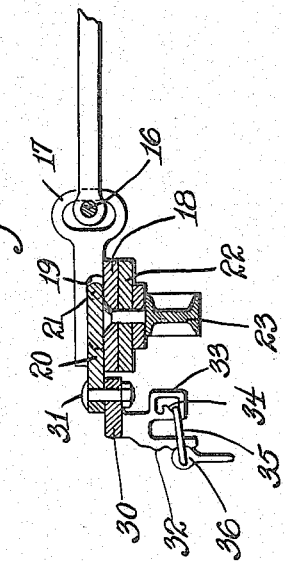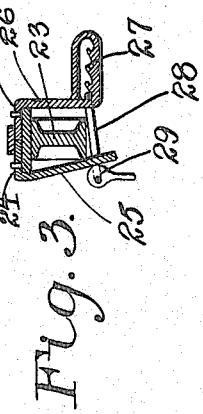

CHRISTIAN D. C. BUUCK, OF HOAGLAND, INDIANA.

TOWING APPARATUS.

1,129,380.	Specification of Letters Patent.	Patented Feb. 23, 1915.

Application filed May 17, 1913. Serial No. 768,320.

*To all whom it may concern:*

Be it known that I, CHRISTIAN D. C. BUUCK, citizen of the United States, residing at Hoagland, in the county of Allen and State of Indiana, have invented certain new and useful Improvements in Towing Apparatus, of which the following is a specification.

This invention relates to towing apparatus especially adapted for use on motor vehicles, which may be advantageously used for conveying incapacitated vehicles to a predetermined place thereby eliminating the use of ropes, chains and other undesirable expedients which have heretofore been used for performing functions of this character.

An object of this invention is the provision of a simple and efficient means which may be readily applied to the rear axle of a vehicle, the end of the towing apparatus which is secured to the disabled vehicle, being of such a peculiar formation that the disabled vehicle will be steered so as to pursue the course taken by that of the towing vehicle.

Another object of this invention is to provide an inexpensive, durable device which has the one end thereof secured to the rear axle of a vehicle, preferably a motor vehicle and having the opposite end secured to the front axle of a disabled vehicle and being so arranged thereon that the curvatures of the course taken by the towing vehicle will be uniform with that of the disabled vehicle in view of the fact that the towing mechanism is arranged in such a manner on the transverse steering shaft of the front axle that the movement of the wheels carried by this axle will be controlled by the movement of the towing vehicle.

Other objects as well as the nature, characteristic features and scope of my invention will be more readily understood from the following description taken in connection with the accompanying drawings and pointed out in the claims forming a part of this specification.

Referring to the drawings: Figure 1 is a top plan view of the device constructed in accordance with my invention and illustrating the application thereof; Fig. 2 is a longitudinal sectional view of the same; Fig. 3 is a sectional view taken on the line 3—3 of Fig. 1; and Fig. 4 is a similar view taken on the line 4—4 of Fig. 1.

In the drawings wherein is shown the preferred form of my invention I have provided a rear axle 5 of a motor vehicle and a front axle 6 which has arranged therewith the ordinary transverse steering rod 7. These axles as shown in the drawings represent different vehicles to which my improved device is applied in order to properly illustrate the same.

My improved towing apparatus in the present instance comprises a reach 8 which has one end thereof bifurcated to provide a vertical slot 9 in the one end thereof, the opposite end thereof being provided with a transverse aperture, the function of which will subsequently appear. The forward or bifurcated end of said reach being engaged with arms 10 which converge outwardly and have arranged on the extreme ends thereof jaws 11, each of said arms being provided with a pair of jaws which are pivotally mounted thereon, said jaws being provided with serrations or teeth 12 which are formed on the outer sides thereof so that the same may be readily engaged by the split collars 13. The ends of each of said jaws are of a preferably semicircular shape so as to conform to the contour of an axle and are provided with a band of rubber or like material 14' so as to prevent the scratching of the axles when the jaws are secured thereto. The said jaws are pivoted so that the same may be readily applied to axles of various circumferential dimensions and are provided with split collars 13 which have arranged therein the thumb or set screws 14 so that the jaws may be securely or positively locked to the rear axle of a vehicle. The arms 10 are secured to the reach 8 through the medium of a pivot pin 15 thereby allowing for the pivotal movement of the arms with respect to the reach.

A pin 16 is passed through the transverse slot in the rear end of said reach 8 and has loosely mounted thereon, the rods 17 which are provided with looped-eyes on the ends thereof, said looped-eyes are enlarged so as to be loosely mounted on the pin 16 as before stated and have the opposite ends thereof rigidly mounted on the disk 18. The rods 17 extend in parallelism on the disk 18 and are provided with slotted inner sides 19 which are shown to advantage in Fig. 4. A shaft 20 is slidably mounted between the rods 17 through the medium of the pin 21 which is disposed in the end of the shaft and has the projecting ends thereof engaged in the slots 19 of the rods 17. The disk 18 is pivotally mounted on the plate 22 which extends transversely of the vehicle and is engaged with the front axle 23 by the yoke member 24. Said yoke member comprises a substantially U-shaped member, the upper portion 24' of which is secured to the plate 22 and contacts with the upper side of the axle 23. Sides 25 and 26 extend downwardly on each side of the axle, the side 25 being preferably of an elastic metal so as to allow for the slight expansion and contraction of the same. The side 26 of the yoke member, has the end thereof extended so as to form a substantially O-shaped member which is provided with a plurality of teeth 27 which are disposed on the lower inner side of the O. A link 28 is carried within the O-shaped member and has pivotally mounted on the opposite end thereof a cam lever 29 which is adapted for engagement with the outer face of the side 25 as shown to advantage in Figs. 2 and 3 of the drawings. The provision of the link 28 is for the purpose of adjusting the yoke member 24 to the various sizes of axles, as this device is adapted for vehicles of the heavier as well as the lighter type and vice versa.

The shaft 20 is provided with a vertical opening or aperture which alines with the vertical aperture which is formed in the ear 29 of the split sleeve 30. A bolt 31 is adapted for engagement through the alining aperture of the shaft 20 and the ear 29 so as to allow for the pivotal movement of the split sleeve 30 with respect to the shaft 20. The split sleeve 30 comprises a substantially U-shaped frame which has the outer face of one of the arms corrugated as indicated at 32 and shown to advantage in Fig. 4 of the drawings. The opposite arm being extended so as to provide a housing 33 which is provided with teeth 34. Disposed within the housing 33 is a link 35 which has pivotally mounted on the one end thereof a cam lever 36 which is adapted for engagement in the corrugated face 32 of the split sleeve 30. The said sleeve 30 is adapted for engagement over the transverse steering shaft 7 and is secured thereto through the medium of the link 35 and cam lever 36. It is therefore obvious that this peculiar form of sleeve may be readily and conveniently used with steering rods of various circumferential dimensions and will positively hold the same thereto. The shaft 20 is slidably mounted within the rods 17 so that the sleeve 30 may be readily applied to steering rods which are associated in close proximity to the front axle of a vehicle as well as steering rods which are spaced apart from the axle.

In operation the jaws 11 are secured to the rear axle of a vehicle and the collars 13 tightened on the corrugated or serrated face 12 thereof through the medium of set screws 14 until the cushioning members 14' engage with the peripheral face of the axle. The yoke member 24 is then secured to the front axle 23 of the incapacitated vehicle, the link 28 being inserted between the teeth 27, which is regulated according to the size of the axle, and the said link swung upwardly so as to inclose the side 25 of the yoke member and the pivot cam 29 turned downwardly into engagement therewith. In order to properly guide the incapacitated or disabled vehicle, a split sleeve 30 is provided which is secured to the transverse steering rod 7 of the vehicle through the medium of an arrangement similar to that of the yoke member 24, namely the provision of a corrugated outer face on the side of the split sleeve and the housing on the opposite arm of the sleeve so as to accommodate the end of the link 35 the opposite end being engaged by the cam 36, and the cam engaging the corrugated face 32 of the sleeve so as to lock the sleeve into engagement with the steering rod.

From the above description it is obvious that I have provided a device which is especially applicable to motor vehicles although the same may be advantageously used with other vehicles, and when used in the latter capacity the split sleeve 30 may be readily removed, by disengaging the pivot bolt 31 from the shaft 20.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent is:—

1. A towing apparatus including a reach, jaws in pivotal connection with one end of the reach for engagement with the rear axle of a towing vehicle, said jaws provided with serrated shanks, a collar mounted on said shank to hold the jaws snugly in engagement with the axle, and a mechanism associated with the opposite end of said reach for engagement with the front axle and steering rod of an incapacitated vehicle to guide the latter in the path taken by the towing vehicle.

2. In combination with an axle having a transverse steering rod, a towing mechanism, including a yoke member carried by said axle, means for preventing the accidental displacement of said yoke member, a split sleeve pivotally mounted on said yoke member for engagement with said steering rod, means for preventing the accidental displacement of said split sleeve, a reach, the one end of which is pivotally connected to said yoke member, arms pivotally connected to the opposite end of said reach, and jaws carried by each of said arms adapted for engagement with a movable object.

3. In combination with an axle having a transverse steering rod, a towing mechanism including a yoke member carried by said axle, means for preventing the accidental displacement of said yoke member, a split sleeve pivotally mounted on said yoke member, for engagement with said steering rod, a link carried by the one side of said split sleeve adapted for locking engagement with the opposite side thereof for preventing the casual displacement of the same, a reach, the one end of which is pivotally connected to said yoke member, integrally formed arms pivotally mounted on said reach, and jaws carried by each of said arms adapted for engagement with a movable object.

4. In combination with an axle having a transverse steering rod, a towing mechanism including a yoke member carried by said axle, a link carried by the one side of said yoke member and adapted for locking engagement with the opposite side for preventing the accidental displacement of the same, a split sleeve pivotally mounted on said yoke member and engaging with said transverse steering rod, a link carried by the one side of said sleeve adapted for engagement with the opposite side thereof, for preventing the casual displacement of the same, a reach, the one end of which is in pivotal connection with said yoke member, integrally formed arms pivotally mounted on the opposite end of said reach and converging outwardly therefrom, jaws carried by each of said arms, and means for holding said jaws into engagement with an object.

5. In combination with an axle having a transverse steering rod, a towing mechanism including a yoke member carried by said axle, a link adjustably carried by the one side of said yoke member, a cam lever carried by the opposite end of said link, having engagement with the opposite side of said yoke member, a split sleeve pivotally mounted on said yoke member for engagement with said steering rod, a link adjustably mounted on the one side of said sleeve, a cam lever carried by the opposite end of said link, adapted for locking engagement with the opposite side of said sleeve, a reach, having the one end thereof pivotally connected to said yoke member, integrally formed arms pivotally mounted on the opposite end of said reach and converging outwardly therefrom, jaws carried by each of said arms, and a split collar carried by said jaws for holding the same into engagement with an object.

6. In combination with a movable vehicle, a towing mechanism including a pair of jaws connected to the rear axle of said movable vehicle, a split collar carried by said jaws for holding the same into engagement with said axle, arms pivotally connected to said jaws, a reach pivotally connected to said arms, a yoke member connected to said reach, a shaft slidably mounted on said yoke member, a split sleeve pivotally mounted on said shaft whereby said sleeve may be adjusted in a longitudinal direction, means for holding said sleeve to a steering element substantially as set forth.

7. A towing mechanism for vehicles including a reach, arms pivotally mounted on the one end of said reach, jaws pivotally mounted on said arms, cushioning elements carried within said jaws, split collars carried by said jaws, a set screw disposed in said collars for holding said jaws in a fixed position, a yoke member pivotally mounted on said reach, said yoke member comprising a plate, arms depending from said plate, a disk carried by the upper face of said plate, rods disposed on said disk each of which is provided with a longitudinal slot on the inner side thereof, a shaft mounted between said rods, a pin carried by said shaft adapted for sliding engagement in said groove, a link adjustably mounted on one of said arms, a cam lever carried by said link adapted for locking engagement with the opposite arm of said yoke member, a split sleeve pivotally connected to said shaft, a link adjustably mounted on the one side of said sleeve, and a cam lever carried by the opposite end of said link adapted for locking engagement with the opposite side of said sleeve, substantially as specified.

In testimony whereof I affix my signature in presence of two witnesses.

CHRISTIAN D. C. BUUCK.

Witnesses:
FREDRICK H. WITTE,
CHARLES HOEPPNER.